(12) United States Patent
Morice et al.

(10) Patent No.: US 9,466,407 B2
(45) Date of Patent: Oct. 11, 2016

(54) ELECTRICAL CABLE COMPRISING AT LEAST ONE ELECTRICALLY INSULATING LAYER

(71) Applicant: NEXANS, Paris (FR)

(72) Inventors: Stephane Morice, Leforest (FR); Rodrigue Sumera, Epinoy (FR)

(73) Assignee: NEXANS, Paris (FR)

(*) Notice: Subject to any disclaimer, the term of this patent is extended or adjusted under 35 U.S.C. 154(b) by 0 days.

(21) Appl. No.: 14/280,789

(22) Filed: May 19, 2014

(65) Prior Publication Data

US 2014/0345905 A1    Nov. 27, 2014

(30) Foreign Application Priority Data

May 22, 2013  (FR) ..................... 13 54611

(51) Int. Cl.
| | |
|---|---|
| H01B 13/00 | (2006.01) |
| H01B 3/44 | (2006.01) |
| H01B 3/00 | (2006.01) |
| C08K 3/00 | (2006.01) |
| C08K 3/10 | (2006.01) |
| C08L 33/08 | (2006.01) |
| C08L 33/12 | (2006.01) |
| H01B 7/30 | (2006.01) |

(52) U.S. Cl.
CPC .......... *H01B 13/0016* (2013.01); *H01B 3/002* (2013.01); *H01B 3/447* (2013.01); *C08K 3/0091* (2013.01); *C08K 3/10* (2013.01); *C08L 33/08* (2013.01); *C08L 33/12* (2013.01); *C08L 2203/202* (2013.01); *H01B 7/303* (2013.01)

(58) Field of Classification Search
USPC ......... 174/19, 21 C, 26 R, 25 R, 102 R, 108, 174/109, 110 R, 113 R, 115, 112; 310/196, 310/179, 180, 195
See application file for complete search history.

(56) References Cited

U.S. PATENT DOCUMENTS

| | | | | |
|---|---|---|---|---|
| 3,000,726 A | * | 9/1961 | Speeding | C22B 34/1272 75/395 |
| 3,956,241 A | * | 5/1976 | Steele | C08G 59/70 526/90 |
| 4,207,427 A | | 6/1980 | Beretta et al. | |
| 5,204,175 A | * | 4/1993 | Umeda | D06M 15/263 174/107 |
| 6,103,317 A | * | 8/2000 | Asai | G02B 6/4494 106/14.05 |
| 6,822,363 B2 | * | 11/2004 | Leijon | H01F 3/10 174/DIG. 14 |
| 6,844,526 B2 | * | 1/2005 | Veggetti | B29C 47/0016 174/120 C |
| 7,061,133 B1 | * | 6/2006 | Leijon | F03D 9/002 174/DIG. 15 |

FOREIGN PATENT DOCUMENTS

| | | |
|---|---|---|
| EP | 2141709 | 1/2010 |
| WO | WO9730460 | 8/1997 |

OTHER PUBLICATIONS

Search Report Dated 2014.

* cited by examiner

*Primary Examiner* — William H Mayo, III
(74) *Attorney, Agent, or Firm* — Sofer & Haroun, LLP (57) ABSTRACT

An electrical cable has an elongate electrical conductor having, in cross section, a plurality of mutually electrically insulated segments having a plurality of metallic wires, at least one of the metallic wires in at least one of the segments being covered by at least one electrically insulating layer. The electrically insulating layer is obtained on the basis of a composition A having at least one acrylic polymer and at least one transition metal salt.

18 Claims, 2 Drawing Sheets

ELECTRICAL CABLE COMPRISING AT LEAST ONE ELECTRICALLY INSULATING LAYER

RELATED APPLICATION

This application claims the benefit of priority from French Patent Application No. FR 13 54611, filed on May 22, 2013, the entirety of which is incorporated by reference.

BACKGROUND

1. Field of the Invention

The present invention pertains to an electrical cable comprising at least one electrically insulating layer, and to a process for manufacturing such an electrical cable.

It applies typically but not exclusively to high-voltage (in particular 60 kV to 500 kV) electrical transmission cables and more particularly to cables intended for the transport of power as alternating current whose conductor is of the Milliken type. Conductors of the Milliken type are generally used for cables of large cross section, in particular greater than 1000 mm$^2$.

More particularly, the invention relates to an electrical cable able to reduce the skin effect and to increase its capacity to transport current.

2. Description of Related Art

The skin effect is a phenomenon of electromagnetic origin, whereby the current has a tendency to flow only at the surface of conductors. This phenomenon exists for all conductors traversed by alternating currents and it causes the decay of the current density within the conductor on moving away from the periphery of the conductor.

With a view to reducing this effect, that is to say to increasing the surface area of the conductor that can receive a high current density, underground cables comprising a conductor of the Milliken type are traditionally used. They are generally composed of several elongate conducting elements, in particular of six elements, exhibiting a (cross) section in the shape of a sector of a circle and called segments or sectors. These sectors are mutually insulated and disposed so as to form a conductor of circular section. The skin effect is reduced because of the fact that each segment is insulated from its neighbor by a non-conducting material. Each sector generally consists of copper or aluminum metallic wires assembled together, in particular by stranding. The stranding of the individual metallic wires in each of the segments and the assembling of these same segments in a helix is well known under the expression "double cabling". However, said double cabling entails alternately passing each of the metallic wires from the exterior of the conductor to the interior of the conductor. The voltage deep within the cable differs from that at the periphery of the cable. A transverse current between the metallic wires situated deep within the cable and those situated at the periphery of the cable is thereby created in each segment of the cable. The low contact resistance between the mutually adjacent metallic wires, which makes it impossible to halt the passage of the electric current from one metallic wire to another, results in a loss of effectiveness of this type of arrangement.

In order to remedy this problem, and thus to obtain a high contact resistance between the mutually adjacent conducting wires, a solution consists in covering each of the metallic wires with an electrically insulating layer of appropriate substance and appropriate thickness.

Accordingly, document U.S. Pat. No. 4,207,427 proposes to surround each of the metallic wires with an insulating coating, with a thickness of between 4 and 10 μm, composed of a cross-linked synthetic resin. This resin comprises a polyvinylacetalic resin cross-linked by means of at least one phenol aldehyde resin and of a melamine resin. The application of said coating to the metallic wire consists of a conventional enameling technique. The metallic wire is immersed in a bath containing said resin diluted in a liquid medium comprising xylene and the wire thus coated is subjected to a thermal treatment in a first zone of the oven at 300° C., and then in a second zone of the oven at a temperature between 400° C. and 500° C.

However, this type of coating exhibits the drawbacks of being very expensive and of having a considerably greater insulating capacity than needed (the dielectric rigidity obtained is about 3000 volts). Indeed, to obtain sufficient insulating capacity, it suffices to have a dielectric rigidity of at least 8 volts. Moreover, said coating is very difficult to remove when connecting the cable to one or more terminations on account of its overly strong adhesion to the conductor.

Furthermore, the process for preparing enameled metallic wires of the prior art exhibits a high production cost. Moreover, it can induce a partial annealing of the metallic wire since the baking cycle is performed at high temperatures, and generates toxic degradation products such as melamine and phenol. Finally, this process exhibits the disadvantage of using a liquid medium comprising xylene, which is difficult to evaporate.

OBJECTS AND SUMMARY

The aim of the present invention is to alleviate the drawbacks of the prior art techniques by proposing in particular an electrical cable comprising at least one electrically insulating layer exhibiting good adhesion and dielectric rigidity properties and to guarantee a reduced skin effect and thus an increased capacity to transport current in said electrical cable.

The first subject of the present invention is an electrical cable comprising an elongate electrical conductor, extending more particularly along the longitudinal axis of said cable, comprising in cross section, a plurality of mutually electrically insulated segments, each of said insulated segments comprising a plurality of metallic wires, at least one of said metallic wires in at least one of said segments being covered by at least one electrically insulating layer, said electrical cable being characterized in that said electrically insulating layer is obtained on the basis of a composition A comprising at least one acrylic polymer and at least one transition metal salt.

By virtue of the electrical cable of the invention, the skin effect is reduced and the capacity to transport current increased. Furthermore, the electrically insulating layer covering at least one of the metallic wires exhibits the advantages of adhering correctly to said metallic wire and of insulating it electrically. Said layer affords it good resilience to aging versus temperature and excellent corrosion resistance.

In a particular embodiment, the electrically insulating layer of the invention has a thickness of from 1 to 20 μm, and preferably from 4 to 8 μm. This very low thickness advantageously limits the quantity of composition A to be used and makes it possible to reduce to the maximum the bulkiness of the cable.

In an exemplary embodiment, the transition metal salt of said composition A of the invention is chosen from among the chromium(III) salts and the fluorotitatanes.

In particular, the chromium(III) salt may be chromium (III) chloride hexahydrate.

Moreover, the chromium(III) salt content may preferably be less than 1% by weight of the composition A for toxicity reasons.

Furthermore, it may be advantageous for the fluorotitanates of the composition A of the invention to be chosen from among $Na_2TiF_4$, $K_2TiF_6$ and $(NH_4)_2TiF_6$.

In a particular embodiment, the acrylic polymer of the composition A of the invention is chosen from among the polyacrylics and the polymethacrylics.

In particular, the polyacrylics are chosen from among the alkyl polyacrylates, the polyacrylamides and the poly (acrylic acids).

The polymethacrylics may be advantageously chosen from among the alkyl polymethacrylates, the polyacrylamides, and the poly(methacrylic acids).

The composition A according to the invention may furthermore comprise a liquid medium such as a diluent and/or a solvent. The liquid medium may be for example water, or preferably demineralized water.

The composition A according to the invention may furthermore comprise at least one organic or inorganic pigment, so as to make it possible to easily identify the final product.

In a particular embodiment, the composition A in accordance with the invention may comprise:
- from 10% to 30% by weight of acrylic polymer(s) and transition metal salt(s),
- from 70% to 90% by weight of liquid medium, and
- from 0% to 20% by weight of organic or inorganic pigment.

The present invention also proposes to implement a process for manufacturing an electrical cable such as described previously in the first subject, which is simple and economical.

The subject of the present invention is therefore a process for manufacturing an electrical cable such as defined previously in the first subject and which comprises the following steps:
  i) heating the surface of a metallic wire to a temperature of at least 100° C., and
  ii) applying said composition A to the metallic wire obtained in step i), so as to obtain said metallic wire covered by said electrically insulating layer.

Said process consists of a wet surface treatment process and makes it possible to modify the surface of the metallic wire by chemical conversion. On contact with the composition A of the invention, the metallic wire is chemically attacked. Particles of metal or of metallic oxides at the surface of said metallic wire are dissolved and react with the composition A according to redox and polymerization reactions, to form an electrically insulating layer which represents a so-called conversion layer.

By virtue of the process of the invention, at least one electrically insulating layer can be easily formed around the surface of at least one metallic wire in at least one of said segments. Moreover, the process in accordance with the invention is simple, economical and fast. Indeed, said process makes it possible to provide about 8 to 100 meters per minute of metallic wire covered with the electrically insulating layer in accordance with the invention.

Preferably, steps i) and/or ii) can be carried out continuously on the metallic wire.

In a particular embodiment, the heating step i) is performed in a conventional oven. By way of example, step i) is carried out by heating the surface of the metallic wire for about 30 seconds in a conventional oven whose temperature is set at about 500° C.

The application of the composition A to the metallic wire according to step ii) of the process of the invention is performed by techniques well known to the person skilled in the art and in particular by immersion or spraying.

In a particular embodiment, the process for manufacturing the electrical cable in accordance with the invention comprises one or more step(s) prior to step i) consisting in degreasing and/or in deoxidizing and/or in scouring the surface of said metallic wire. The degreasing step makes it possible to render the metallic wire devoid of greases and of other organic particles. The deoxidation and scouring steps allow the elimination of oxides and/or of metallic particles other than those of the metal constituting said metallic wire. These prior steps of surface preparation thus make it possible to avoid the appearance of surface defects such as crazing, flaking of the surface, etc. Good preparation of the surface by chemical or mechanical means well known to the person skilled in the art affords better protection and adhesion of the electrically insulating layer of the invention.

These steps prior to step i) of the process in accordance with the invention are performed preferably by immersion of said metallic wire in a degreasant solution and/or a deoxidant solution and/or a scouring solution.

The process in accordance with the invention can advantageously comprise a step iii), subsequent to step ii), consisting in drying said metallic wire. In particular, said metallic wire can be dried in a conventional oven set at a temperature of about 450° C.

In a particularly preferred embodiment, the process for manufacturing the electrical cable of the invention is characterized in that the temperature of step i) is between 110° C. and 160° C. Indeed, the control of the temperature during this step makes it possible to define the thickness of the electrically insulating layer which will cover the metallic wire. In this interval of temperatures, the risks of discontinuity of the deposition and of burning and/or blistering of the coating are significantly limited, or indeed avoided.

The process such as defined hereinabove can be implemented several times if it is desired to obtain a metallic wire covered with several electrically insulating layers obtained on the basis of a composition A comprising at least one acrylic polymer and at least one transition metal salt.

The second subject of the present invention is an electrical cable comprising an elongate electrical conductor, extending more particularly along the longitudinal axis of said cable, comprising in cross section, a plurality of mutually electrically insulated segments, each of said insulated segments comprising a plurality of metallic wires, at least one of said metallic wires in at least one of said segments being covered by at least one electrically insulating layer, said electrical cable being characterized in that said electrically insulating layer is obtained on the basis of a composition B comprising a thermosetting powder of polyester type.

By virtue of the electrical cable thus obtained, the skin effect is also reduced and the capacity to transport current increased. Furthermore, the electrically insulating layer covering at least one of the metallic wires exhibits the advantages of adhering correctly to said metallic wire and of insulating it electrically. Said layer affords it good resilience to aging versus temperature and excellent corrosion resistance.

In a particularly preferred embodiment, the thermosetting powder of polyester type of the invention can be a polyester with a mean molecular weight of a number larger than 10000, formed by addition of units x=[O—(CH$_2$)$_n$—OCO—(CH$_2$)$_m$—CO] and/or y=[O—(CH$_2$)$_k$—CO], where the sum n+m and the number k are such that the melting temperature of said polyester is strictly greater than 80° C. This type of polyester makes it possible advantageously to obtain a thermosetting powder of polyester type which is insensitive to water and difficult to hydrolyze.

In a particular embodiment, the electrically insulating layer of the invention has a thickness of from 10 μm to 60 μm, and preferably from 20 to 40 μm.

The composition B according to the invention can furthermore comprise at least one organic or inorganic pigment so as to make it possible to easily identify the final product.

According to a first variant, the composition B in accordance with the invention comprises the thermosetting powder of polyester type and optionally an organic or inorganic pigment.

According to a second variant, the composition B contains solely the thermosetting powder of polyester type and optionally an organic or inorganic pigment. By way of example, the composition B comprises:
- from 80% to 100% by weight of thermosetting powder of polyester type,
- from 0% to 20% by weight of organic or inorganic pigment.

Therefore, drips, the formation of bubbles and the pollution of the air and of the water during its application to the metallic wire are avoided since the composition does not contain any liquid medium such as a solvent and/or a diluent. The electrically insulating layer thus obtained is more uniform, hard and resistant to impacts.

The subject of the present invention is also a process for manufacturing an electrical cable such as defined previously in the second subject. Said process in accordance with the invention comprises the following steps:
i) applying said composition B to a metallic wire, and
ii) subjecting said metallic wire obtained in step i), to a temperature sufficient to thermoset the thermosetting powder of polyester type and thus obtain said metallic wire covered by said electrically insulating layer.

Thus, by virtue of the process of the invention, at least one electrically insulating layer can easily and rapidly be formed around the surface of at least one metallic wire in at least one of said segments. Indeed, said process makes it possible to provide about 30 to 80 meters per minute of metallic wire covered with the electrically insulating layer in accordance with the invention.

Preferably, steps i) and/or ii) can be carried out continuously on the metallic wire.

To perform the application of the composition B according to step i) of the process in accordance with the invention, it is possible to use in a manual or automatic manner, an electrostatic spraying or atomization system and more particularly an electrostatic gun. The potting of the metallic wire with the aid of such a system requires less precision on the part of the operator. It is also possible to use a standard fluidized bed or one of electrostatic type.

When the composition B is applied to the metallic wire, said metallic wire covered with said composition B is subjected to a thermal treatment according to step ii) of the process in accordance with the invention. For this step, all types of ovens may be used such as forced air convection ovens (heating by gas or electrical heating), infra-red ovens, or ovens combining both heating systems. It will however be preferred to perform the thermal treatment in an infra-red (Near Infra Red) oven since it allows a faster polymerization reaction (of the order of 10 seconds) than when a conventional convection oven is used in which the polymerization rate is of the order of 105 seconds.

When a conventional convection oven is used alone, the thermal treatment of step ii) is performed at a temperature ranging from 250° C. to 290° C. for 100 to 120 seconds.

In order to increase the production rate, said composition B may be subjected to a first thermal treatment with the aid of an infra-red oven, and then to a second thermal treatment with the aid of a conventional convection oven.

In this case, the first thermal treatment is performed at a power varying from 2.5 kW to 2.9 kW for 6 to 10 seconds, and then the second thermal treatment is performed at a temperature ranging from 250° C. to 290° C. for 45 to 65 seconds.

During step ii), the composition B comprising a thermosetting powder of polyester type, melts and flows as a uniform thin layer reacting chemically to form a cross-linking network with high molecular weight. Once the polymerization reaction has terminated, it no longer softens when it is reheated.

On completion of this step ii), a pasty layer covering said metallic wire is formed.

In a particular embodiment, the process for manufacturing the electrical cable in accordance with the invention comprises one or more step(s) prior to step i) consisting in degreasing and/or in deoxidizing and/or in scouring the surface of said metallic wire. These prior steps of surface preparation make it possible to render the metallic wire devoid of any type of dirt, grease, oxides, dust, which generally give rise to surface defects such as crazing, flaking of the surface, etc. Good preparation of the surface by chemical or mechanical means well known to the person skilled in the art, affords better protection and adhesion of the electrically insulating layer of the invention.

In a particular embodiment, the process for manufacturing the electrical cable in accordance with the invention comprises a step iii), subsequent to step ii), consisting in cooling said metallic wire. This step makes it possible to avoid deforming said pasty layer which is still soft on exit from the oven.

In the course of this step iii), said metallic wire is left to cool to a temperature of about 80° C.

In particular, said metallic wire can be cooled by water whose temperature is below 50° C. so as to prevent the wires thus coated from sticking together.

The process such as defined hereinabove can be implemented several times if it is desired to obtain a metallic wire covered with several electrically insulating layers obtained on the basis of a composition B comprising a thermosetting powder of polyester type.

In the present invention, the constituent metallic wires, thus covered by the electrically insulating layer obtained on the basis of a composition A according to the first subject of the invention or of a composition B according to the second subject of the invention, of at least one electrically insulated segment of the elongate electrical conductor can be assembled together and/or compacted.

According to a first variant, the constituent metallic wires of at least one electrically insulated segment of the elongate electrical conductor of the electrical cable of the invention, are electrically insulated metallic wires. Stated otherwise, a segment can comprise one or more insulated wires covered with the electrically insulating layer according to the invention and one or more conventional insulated wires.

Preferably, each of said constituent metallic wires of at least one electrically insulated segment of the elongate electrical conductor of the invention is covered with said electrically insulating layer of the invention.

In a still more preferred manner, all the constituent metallic wires of the elongate electrical conductor of the electrical cable of the invention are covered with said electrically insulating layer of the invention.

According to a second variant, only part of the constituent metallic wires of at least one electrically insulated segment of the elongate electrical conductor of the electrical cable of the invention, are electrically insulated metallic wires. Stated otherwise, a segment can comprise one or more electrically insulated metallic wires and one or more bare, that is to say electrically uninsulated, wires.

Preferably, two thirds of said constituent metallic wires of at least one electrically insulated segment of the elongate electrical conductor of the invention are covered with said electrically insulating layer of the invention, the remaining one third of said metallic wires being bare wires and positioned in such a way that they do not touch one another.

In a still more preferred manner, two thirds of said constituent metallic wires of the elongate electrical conductor of the electrical cable of the invention are covered with said electrically insulating layer of the invention, the remaining one third of said metallic wires being bare wires and positioned in such a way that they do not touch one another.

The elongate electrical conductor of the invention is preferably made of copper, copper alloy, aluminum or aluminum alloy.

More particularly, the cable of the invention can be an electrical cable with Milliken conductor of power cable type. In this case, the elongate electrical conductor of the invention is surrounded by a first semi-conducting layer, the first semi-conducting layer being surrounded by an electrically insulating layer, and the electrically insulating layer being surrounded by a second semi-conducting layer, said electrically insulating layer being different from the electrically insulating layer obtained on the basis of a composition A according to the first subject of the invention or of a composition B according to the second subject of the invention.

In a particular embodiment, generally in accordance with the electrical cable with Milliken conductor of power cable type of the invention, the first semi-conducting layer, the electrically insulating layer and the second semi-conducting layer constitute a three-layer insulation. Stated otherwise, the electrically insulating layer is directly in physical contact with the first semi-conducting layer, and the second semi-conducting layer is directly in physical contact with the electrically insulating layer.

In a preferred embodiment, the first semi-conducting layer and/or the second semi-conducting layer may be respectively a first semi-conducting shield and/or a second semi-conducting shield. Said first and/or second semi-conducting shields then make it possible to prevent the concentration of the electric field within the cable.

In a particular embodiment, the electrically insulating layer and the first and second semi-conducting layers of the cable of the invention, may conventionally be cross-linked layers obtained on the basis of a composition based on polyolefin (e.g. polyethylene).

The electrical cable of the invention can furthermore comprise a metallic shield surrounding the second semi-conducting layer.

This metallic shield can be a so-called "wired" shield composed of a set of copper or aluminum conductors arranged around and along the second semi-conducting layer, a so-called "banded" shield composed of one or more copper or aluminum conducting metallic bands optionally laid in a helix around the second semi-conducting layer, or of a so-called "leaktight" shield of metallic tube type optionally composed of lead or of lead alloy and surrounding the second semi-conducting layer. The latter type of shield makes it possible in particular to offer a barrier to the moisture that has a tendency to penetrate the electrical cable in the radial direction.

The metallic shield of the electrical cable of the invention can comprise a so-called "wired" shield and a so-called "leaktight" shield or a so-called "wired" shield and a so-called "banded" shield.

All the types of metallic shields can play the role of earthing of the electrical cable and can thus transport fault currents, for example in case of short-circuit in the network concerned.

Furthermore, the cable of the invention can comprise an exterior protection sheath surrounding the second semi-conducting layer, or else surrounding more particularly said metallic shield when it exists. This exterior protection sheath can be produced conventionally on the basis of appropriate thermoplastic materials such as HDPEs, MDPEs or LLDPEs; or else materials that retard flame propagation or that resist flame propagation such as PVCs. However, preference will be given to materials that retard flame propagation or that resist flame propagation and which do not contain any halogen, one then speaks of sheathing of HFFR (standing for "Halogen Free Flame Retardant") type.

Other layers, such as layers which swell in the presence of moisture can be added between the second semi-conducting layer and the metallic shield when it exists and/or between the metallic shield and the exterior sheath when they exist, these layers making it possible to ensure the longitudinal leaktightness of the electrical cable to water.

BRIEF DESCRIPTION OF THE DRAWINGS

Other characteristics and advantages of the present invention will become apparent in the light of the examples which will follow with reference to the annotated figures, said examples and figures being given by way of wholly non-limiting illustration.

DETAILED DESCRIPTION

For the sake of clarity, only the elements essential for the understanding of the invention have been represented in a schematic manner, not to scale.

Figure 1:
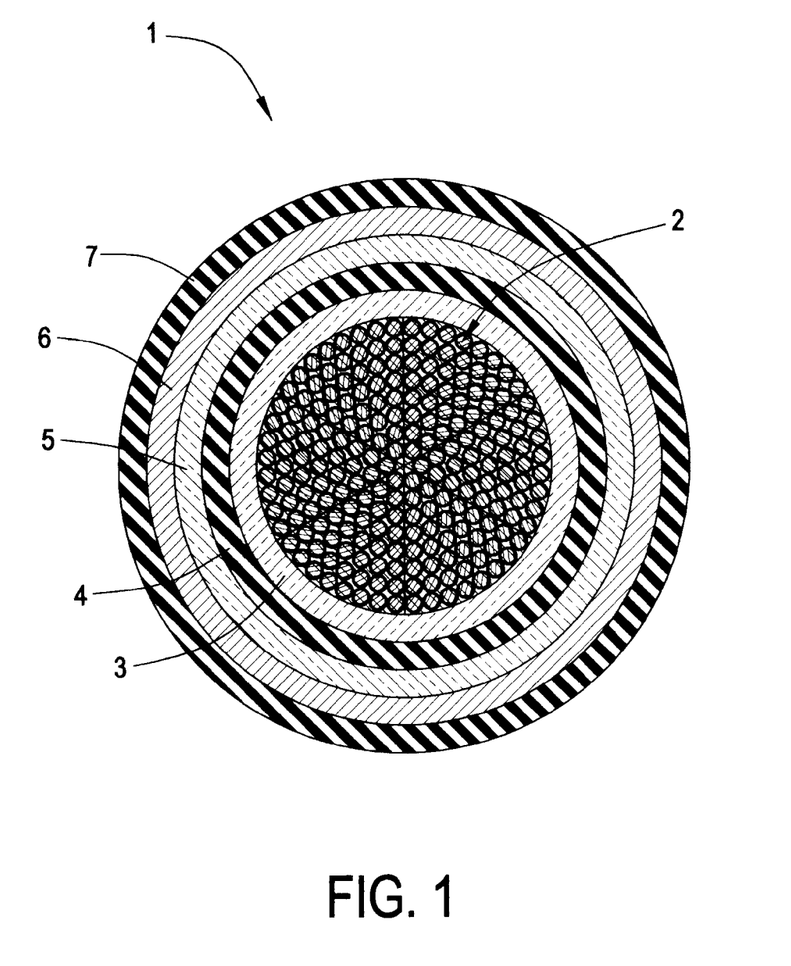
FIG. 1 represents in a schematic manner an electrical cable comprising a central electrical conductor, in cross section, in accordance with the invention.

The electrical cable 1 illustrated in FIG. 1 is a high-voltage cable of Milliken type. It comprises an elongate electrical conductor 2 extending along the longitudinal axis of said cable, made in particular of copper or aluminum, and comprises successively and coaxially around this conductor 2, a first semi-conducting layer 3 termed the "internal semi-conducting layer", an electrically insulating layer 4, a second semi-conducting layer 5 termed the "external semi-conducting layer", a metallic shield 6, and an exterior protection sheath 7.

Figure 2:
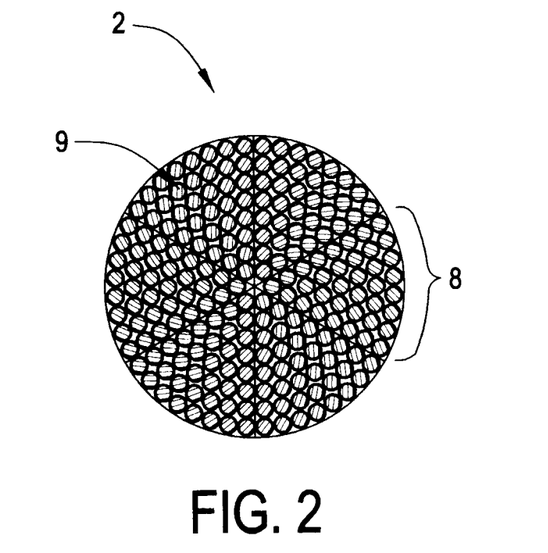
FIG. 2 represents in a schematic manner the central electrical conductor of the cable of FIG. 1.

Furthermore, as illustrated in FIG. 2, the elongate electrical conductor 2 comprises six segments 8, mutually electrically insulated, of triangular cross sectional shape. Each of said insulated segments 8 comprises a plurality of electrically insulated metallic wires 9.

Figure 3:
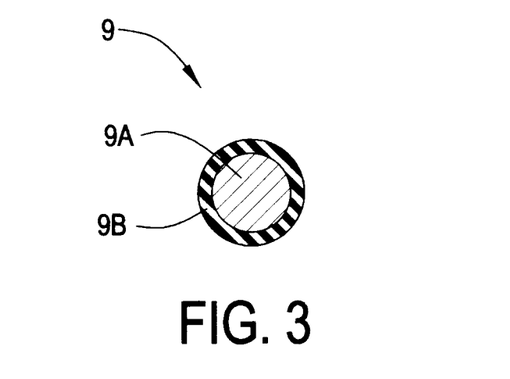
FIG. 3 represents in a schematic manner one of the metallic wires of one of the segments of the central electrical conductor of FIG. 2.

FIG. 3 is an magnification of one of the electrically insulated metallic wires 9 of one of the segments 8 of the central electrical conductor 2 of FIG. 2. This figure makes it evident that the electrically insulated metallic wire 9 comprises a central core 9a, made of copper or aluminum, surrounded by the electrically insulating layer 9b obtained on the basis of a composition A according to the invention.

EXAMPLES

1. Preparation of the Composition A and of the Electrically Insulating Layer in Accordance with the First Subject of the Invention Composition A was obtained by adding 20% by weight of a solution of Brugal G50 WHP®, marketed by Procoat Tecnologias, to demineralized water.

In order to show the properties of the invention, seven coils of copper wire 300 m in length and 2.58 mm in diameter were covered with an electrically insulating layer obtained on the basis of said composition A according to the process in accordance with the first subject of the invention.

Accordingly, the surface of the metallic wires constituting the seven coils was prepared beforehand by performing:
- an electrolytic degreasing by immersion of said metallic wires in a 100 g/l solution of Non-acid 701® degreasant marketed by Atotech at a temperature of 55° C. and with an anodic current density (anodic c.d.) of 20 A/dm$^2$,
- a deoxidation by immersion of said metallic wires in an 80 g/l solution of Metex ACS 1400® deoxidant marketed by Mac Dermid at a temperature of 35° C., and
- a chemical scouring by immersion of said metallic wires in a 30% solution by volume of sulfuric acid at a temperature of 50° C.

The duration of immersion of said metallic wires in each of the three solutions varies from 18 seconds to about 1 and a half minutes.

The following steps were carried out continuously with the aid of a pilot line comprising:
- a first oven (oven 1) whose temperature was set at about 500° C.,
- a spraying chamber placed at ambient temperature, and
- a second oven (oven 2) whose temperature was set at about 450° C.

The rate of travel of the metallic wire constituting each coil during its passage through oven 1, through the spraying chamber and through oven 2 is about 2 m/min.

The copper wires whose surface was prepared beforehand were therefore heated in oven 1 for about 30 seconds to reach a temperature of about 120° C. Thereafter, the copper wires were sprayed in the spraying chamber with the composition A prepared beforehand, so as to obtain the copper wires of said coils covered by said electrically insulating layer. The coils were finally dried in oven 2 for about 30 seconds.

Table 1 presented hereinbelow indicates the mean thickness of the electrically insulating layer covering the metallic wire constituting each coil. This mean thickness was calculated on the basis of the microscope sections (magnification of the objective of the

TABLE 1

| Coil Number | Thickness (in μm) |
|---|---|
| 1 | 4.0 |
| 2 | 7.0 |
| 3 | 5.8 |
| 4 | 7.9 |
| 5 | 8.0 |
| 6 | 7.9 |
| 7 | 6.9 |

Thus, the thickness of the electrically insulating layer covering the metallic wire varies from 4 to about 8 μm when the same operative conditions are used. This variation may be related to the aging of the baths used and to the imperfect homogeneity of the heat in the ovens 1 and 2.

2. Tests Carried Out on the Copper Wire of Each Coil and Covered by the Electrically Insulating Layer in Accordance with the First Subject of the Invention 2.1 Wire-Drawing The wire-drawing method is a cold shaping process which consists in stretching a wire while progressively reducing its diameter through tools called dies. The diameter of the wire is then decreased from 2.58 mm to 2.54 mm by virtue of a die marketed by the company Esteves. This decrease must not exceed the desired percentage of elastic elongation which corresponds to 3%. This makes it possible to simulate the compression which generally occurs during the formation of an electrical cable.

It is apparent, in accordance with the results of the wire-drawing test, that the metallic wires covered with the electrically insulating layer in accordance with the invention draw well. Said electrically insulating layer remains on the whole of the surface of the wire without exhibiting discontinuities, thus evidencing good adhesion of said layer to the metallic wire. Moreover, the electrically insulating layer of the invention possesses the required abilities to resist the compression force caused during cable formation.

2.2 Measurements of Dielectric Rigidities

The dielectric rigidity is a process which makes it possible to indicate the insulating capacity of the electrically insulating layer in accordance with the invention covering the copper wire of each of the coils. It consists in measuring the breakdown voltage (in volts) at which the current passes through the insulating layer. The rigidity before and after wire-drawing must be at the minimum 8 volts so as to have sufficient insulating capacity.

A current generator marketed by the company Conrad and providing a voltage of 0 to 15 volts was used. The positive terminal of the generator was linked to a part of the copper wire not covered by the electrically insulating layer of the invention. The part of the copper wire comprising the electrically insulating layer of the invention was thereafter covered by an aluminum layer of thickness 1 cm, and then was connected to the negative terminal of the generator. The current was increased progressively until the appearance of a voltage, evidencing the value of the rigidity. Three measurements were carried out before and after wire-drawing.

Table 2 presented hereinbelow indicates the dielectric rigidities obtained before and after wire-drawing.

TABLE 2

| Coil number | Dielectric rigidity before wire-drawing (Volts) | | | Dielectric rigidity after wire-drawing (Volts) | | |
|---|---|---|---|---|---|---|
| | Trial 1 | Trial 2 | Trial 3 | Trial 1 | Trial 2 | Trial 3 |
| 1 | 15 | 15 | 15 | 15 | 15 | 15 |
| 2 | 15 | 15 | 15 | 15 | 15 | 15 |
| 3 | 15 | 15 | 15 | 15 | 15 | 15 |
| 4 | 15 | 15 | 15 | 15 | 15 | 15 |
| 5 | 15 | 15 | 15 | 15 | 15 | 15 |
| 6 | 15 | 15 | 15 | 15 | 15 | 15 |
| 7 | 15 | 15 | 15 | 15 | 15 | 15 |

It is apparent in accordance with table 2 that the dielectric rigidity obtained is sufficient both before wire-drawing and after wire-drawing.

2.3 Winding Test

This test makes it possible to analyze the mechanical resilience of the electrically insulating layer of the invention and thus its capacity to craze following the application of a shape modification.

In the course of the test, the metallic wire was wound around its own diameter by several turns stuck to one another. An internal standard imposes a resistance of the coating over a minimum of 3 turns stuck to one another.

The test was carried out several times and showed no crazing.

2.4 Measurements of Temperature Resilience

The insulating layer in accordance with the first subject of the invention exhibits a resilience to temperatures of 105° C. and 120° C. respectively of 20 days and 10 days while retaining the same characteristics. These measurements were performed with ventilated stoves.

Furthermore, the electrically insulating layer of the invention makes it possible to protect the metallic wire against corrosion during more than 1000 hours in contact with a salt mist.

3. Preparation of the Composition B and of the Electrically Insulating Layer in Accordance with the Second Subject of the Invention The composition B comprising a thermosetting powder of polyester type used is a composition marketed by the company Dupont under the trade name Alesta®SPEED.

In order to show the properties of the invention, three coils of copper wire 300 m (coils No. 1 and No. 3) and 900 m (coil No. 2) in length, and 2.58 mm in diameter were covered with an electrically insulating layer obtained on the basis of said composition B according to the process in accordance with the second subject of the invention.

Accordingly, the surface of the metallic wires constituting the three coils was prepared beforehand by performing:
an electrolytic degreasing by immersion of said metallic wires in a 100 g/l solution of Non-acid 701® degreasant marketed by Atotech at a temperature of 55° C. and with an anodic current density (anodic c.d.) of 20 A/dm,
a deoxidation by immersion of said metallic wires in an 80 g/l solution of Metex ACS 1400® deoxidant marketed by Mac Dermid at a temperature of 35° C., and
a chemical scouring by immersion of said metallic wires in a 30% solution by volume of sulfuric acid at a temperature of 50° C.

The duration of immersion of said metallic wires in each of the three solutions varies from 18 seconds to about 1 and a half minutes.

The following steps were carried out continuously with the aid of a pilot line comprising:
a paint booth placed at ambient temperature,
a first NEAR oven marketed by the company Heraus (oven 1) whose power was set at 2.7 Kw,
a second conventional convection oven (oven 2) whose temperature was set at about 280° C.,
a cooling water jet whose temperature was set at about 18° C.

The rate of travel of the metallic wire constituting each coil during its passage through the paint booth, oven 1, oven 2 and the cooling bath is about 7 m/min.

The copper wires whose surface was prepared beforehand were therefore sprayed with the composition B in the paint booth with the aid of a gun. The gun is placed about 1 meter from the entrance of the paint booth. The efficiency is about 95%.

The copper wires thus covered with said composition B were subjected to a thermal treatment making it possible to thermoset the thermosetting powder of polyester type, namely:
the metallic wire constituting coil No. 1 was passed only through oven 2 for 105 seconds, and
the metallic wires constituting coils No. 2 and No. 3 were passed through oven 1 for about 6 seconds and then through oven 2 for 50 seconds.

In contradistinction to the conventional convection oven (oven 2), the NEAR oven (oven 1) makes it possible to reach very high temperatures.

Coils No. 1 to No. 3 are thereafter cooled with water whose temperature is set at 18° C., so as to avoid any sticking.

Table 3 presented hereinbelow indicates the mean thickness of the electrically insulating layer covering the metallic wire constituting each coil. This mean thickness was calculated on the basis of the microscope sections (magnification of the objective of the microscope: 60 times).

TABLE 3

| Coil Number | Thickness (in μm) |
|---|---|
| 1 | 16.0 |
| 2 | 45.5 |
| 3 | 28.3 |

Thus, the mean thickness of the electrically insulating layer covering the metallic wire varies from 16 to about 46 μm.

4. Tests Carried Out on the Copper Wire of Each Coil and Covered by the Electrically Insulating Layer in Accordance with the Second Subject of the Invention 4.1 Wire-Drawing The wire-drawing experiments were performed as in example 2.1.

It is apparent in accordance with the results of the test that the metallic wires covered with the electrically insulating layer in accordance with the second object of the invention draw well. Said electrically insulating layer remains on the whole of the surface of the wire without exhibiting discontinuities, thus evidencing good adhesion of said layer to the metallic wire. Moreover, the electrically insulating layer of the invention possesses the required abilities to resist the compression force caused during cable formation.

4.2 Measurements of Dielectric Rigidities

The experiments of dielectric rigidities obtained before and after wire-drawing and before and after aging of the metallic wires covered with the electrically insulating layer, were performed as in example 2.2.

Table 4-1 presented hereinbelow indicates the dielectric rigidities obtained before aging of the metallic wires before and after wire-drawing.

TABLE 4-1

| Coil number | Dielectric rigidity before wire-drawing (Volts) | | | Dielectric rigidity after wire-drawing (Volts) | | |
|---|---|---|---|---|---|---|
| | Trial 1 | Trial 2 | Trial 3 | Trial 1 | Trial 2 | Trial 3 |
| 1 | 15 | 15 | 15 | 15 | 15 | 15 |
| 2 | 15 | 15 | 15 | 15 | 15 | 15 |
| 3 | 15 | 15 | 15 | 15 | 15 | 15 |

It is apparent that the dielectric rigidity obtained is still about 15 volts. It is therefore sufficient both before wire-drawing and after wire-drawing when the metallic wires covered with the electrically insulating layer have not undergone any aging versus temperature.

Table 4-2 presented hereinbelow indicates the dielectric rigidities obtained after aging versus temperature of the metallic wires covered with the electrically insulating layer at a temperature of 105° C. for 20 days, before and after wire-drawing.

TABLE 4-2

| Coil number | Dielectric rigidity before wire-drawing (Volts) | | | Dielectric rigidity after wire-drawing (Volts) | | |
|---|---|---|---|---|---|---|
| | Trial 1 | Trial 2 | Trial 3 | Trial 1 | Trial 2 | Trial 3 |
| 1 | 15 | 15 | 15 | 15 | 15 | 15 |
| 2 | 15 | 15 | 15 | 15 | 15 | 15 |
| 3 | 15 | 15 | 15 | 15 | 15 | 15 |

It is apparent that the dielectric rigidity obtained is still about 15 volts. It is therefore sufficient both before wire-drawing and after wire-drawing when the metallic wires covered with the electrically insulating layer have undergone aging versus temperature.

4.3 Winding Test

The test was carried out several times as in example 2.3 and showed no crazing (wire of diameter 2.7 mm).

4.4 Measurements of Temperature Resilience

Its resilience at the temperature of 90° C. is at least 20 days.

The invention claimed is:

1. Electrical cable comprising:
an elongate electrical conductor having, in cross section, a plurality of mutually electrically insulated segments each of which having a plurality of metallic wires, at least one of said metallic wires in at least one of said segments being covered by at least one electrically insulating layer,
wherein said electrically insulating layer is obtained on the basis of a composition A having at least one acrylic polymer and at least one transition metal salt.

2. Electrical cable according to claim 1, wherein said electrically insulating layer has a thickness from 4 to 8 μm.

3. Electrical cable according to claim 1, wherein the transition metal salt is selected from the group consisting of the chromium(III) salts and the fluorotitatanes.

4. Electrical cable according to claim 3, wherein the chromium(III) salt is chromium(III) chloride hexahydrate.

5. Electrical cable according to claim 3, wherein the fluorotitanates are selected from the group consisting of $Na_2TiF_6$, $K_2TiF_6$ and $(NH_4)_2TiF_6$.

6. Electrical cable according to claim 1, wherein the acrylic polymer is selected from the group consisting of the polyacrylics and the polymethacrylics.

7. Electrical cable according to claim 6, wherein the polyacrylics are selected from the group consisting of the alkyl polyacrylates, the polyacrylamides and the poly(acrylic acids).

8. Electrical cable according to claim 6, wherein the polymethacrylics are selected from the group consisting of the alkyl polymethacrylates, the polyacrylamides, and the poly(methacrylic acids).

9. Electrical cable according to claim 1, wherein said composition A further comprises a liquid medium.

10. Electrical cable according to claim 1, wherein the composition A further comprises at least one organic or inorganic pigment.

11. Electrical cable according to claim 1, wherein two thirds of said constituent metallic wires of at least one electrically insulated segment of the elongate electrical conductor are covered with said electrically insulating layer, the remaining one third of said metallic wires being bare wires and positioned in such a way that they do not touch one another.

12. Electrical cable according to claim 1, wherein each of said constituent metallic wires of at least one electrically insulated segment of the elongate electrical conductor is covered with said electrically insulating layer.

13. Electrical cable according to claim 1, wherein all the constituent metallic wires of the elongate electrical conductor are covered with said electrically insulating layer.

14. Electrical cable according to claim 1, wherein said elongate electrical conductor is surrounded by a first semi-conducting layer, the first semi-conducting layer being surrounded by an electrically insulating layer, and the electrically insulating layer being surrounded by a second semi-conducting layer, said electrically insulating layer being different from the electrically insulating layer of the metallic wires constituting said elongate electrical conductor.

15. Process for manufacturing an electrical cable according to claim 1, wherein the process comprises the following steps:
i) heating the surface of a metallic wire to a temperature of at least 100° C., and
ii) applying said composition A to the metallic wire obtained in step i), so as to obtain said metallic wire covered by said electrically insulating ayer.

16. Process for manufacturing an electrical cable according to claim 15, wherein said process further comprises a step, prior to step i) including degreasing and/or in deoxidizing and/or in scouring the surface of said metallic wire.

17. Process for manufacturing an electrical cable according to claim 15, wherein said process further comprises a step iii), subsequent to step ii), including drying said metallic wire covered by said electrically insulating layer.

18. Process for manufacturing an electrical cable according to claim 15, wherein the temperature of step i) lies between 110° C. and 160° C.

* * * * *

UNITED STATES PATENT AND TRADEMARK OFFICE
CERTIFICATE OF CORRECTION

PATENT NO. : 9,466,407 B2
APPLICATION NO. : 14/280789
DATED : October 11, 2016
INVENTOR(S) : Morice et al.

Page 1 of 1

It is certified that error appears in the above-identified patent and that said Letters Patent is hereby corrected as shown below:

In the claims

Column 14, (Line 53) Claim 15, Line 8: The word "aver" after the words "electrically insulated" should read as "layer."

Signed and Sealed this
Twentieth Day of December, 2016

Michelle K. Lee
*Director of the United States Patent and Trademark Office*